US011945406B2

(12) United States Patent
Johnson (10) Patent No.: US 11,945,406 B2
(45) Date of Patent: *Apr. 2, 2024

(54) SPACECRAFT DEVICE WITH INCREASED CARGO CAPACITIES, AND ASSOCIATED SYSTEMS AND METHODS (71) Applicant: Blue Origin, LLC, Kent, WA (US)

(72) Inventor: Michael David Johnson, Tomball, TX (US)

(73) Assignee: BLUE ORIGIN, LLC, Kent, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/099,192

(22) Filed: Jan. 19, 2023

(65) Prior Publication Data

US 2023/0202399 A1 Jun. 29, 2023

Related U.S. Application Data (63) Continuation of application No. 16/370,660, filed on Mar. 29, 2019, now Pat. No. 11,565,628.

(51) Int. Cl.
B64G 1/64 (2006.01)
B60R 5/04 (2006.01)
(Continued)

(52) U.S. Cl.
CPC .............. B60R 5/041 (2013.01); B64G 1/005 (2013.01); B64G 1/402 (2013.01); B64G 1/425 (2013.01); B64G 1/64 (2013.01); B64G 1/641 (2013.01)

(58) Field of Classification Search
CPC ... B64G 1/00; B64G 1/22; B64G 1/64; B64G 1/641; B64G 1/645; B64G 2001/643;
(Continued)

(56) References Cited

U.S. PATENT DOCUMENTS 933,070 A 9/1909 Gleanson
2,807,429 A 9/1957 Hawkins et al.
(Continued)

FOREIGN PATENT DOCUMENTS

KR 10-0779798 11/2007
KR 20-2014-0002805 5/2014

OTHER PUBLICATIONS

Ito et al., "Optimal Design of a Mechanism Used for Opening and Shutting a Ship's Hatch Cover". J. Mech., Trans., and Automation. Dec. 1984, 106(4), 7 pages.
(Continued)

Primary Examiner — Richard Green
Assistant Examiner — Michael A. Fabula
(74) Attorney, Agent, or Firm — Hogan Lovells US LLP (57) ABSTRACT A representative spacecraft system includes a launch vehicle elongated along a launch vehicle axis and having at least one stage carrying a corresponding rocket engine. The representative system further includes an annular support structure carried by the at least one stage and positioned to support a cargo spacecraft having a service module and a cargo module. The cargo module of the cargo spacecraft is positioned along the launch vehicle axis in a direction distal from the support structure, and at least a portion of the service module of the cargo spacecraft positioned within an annulus of the support structure.

21 Claims, 7 Drawing Sheets (51) Int. Cl.
*B64G 1/00* (2006.01)
*B64G 1/40* (2006.01)
*B64G 1/42* (2006.01)

(58) Field of Classification Search
CPC  B64G 2001/1092; B64G 1/005; B64G 1/402; B64G 1/405; B60R 5/041
See application file for complete search history.

(56) References Cited

U.S. PATENT DOCUMENTS

| | | | |
|---|---|---|---|
| 3,814,350 | A | 6/1974 | Fletcher |
| 3,966,142 | A | 6/1976 | Corbett et al. |
| 4,479,622 | A | 10/1984 | Howse |
| 4,601,446 | A | 7/1986 | Opshal |
| 4,608,926 | A | 9/1986 | Stevens |
| 4,842,223 | A | 6/1989 | Allton et al. |
| 4,854,010 | A | 8/1989 | Maraghe et al. |
| 4,964,340 | A | 10/1990 | Daniels et al. |
| 5,052,638 | A | 10/1991 | Minovitch |
| 5,104,070 | A | 4/1992 | Johnson |
| 5,242,135 | A | 9/1993 | Scott |
| 5,318,256 | A | 6/1994 | Appleberry et al. |
| 5,372,071 | A | 12/1994 | Richards |
| 5,568,901 | A | 10/1996 | Stiennon |
| 5,605,308 | A | 2/1997 | Quan |
| 5,628,476 | A | 5/1997 | Soranno |
| 5,667,167 | A | 9/1997 | Kistler |
| 5,678,784 | A | 10/1997 | Marshall, Jr. et al. |
| 5,743,492 | A | 4/1998 | Chan |
| 5,816,539 | A | 10/1998 | Chan |
| 5,898,123 | A | 4/1999 | Fritz et al. |
| 5,927,653 | A | 7/1999 | Mueller et al. |
| 6,053,454 | A | 4/2000 | Smolik |
| 6,176,451 | B1 | 1/2001 | Drymon |
| 6,193,187 | B1 | 2/2001 | Scott et al. |
| 6,206,327 | B1 | 3/2001 | Benedetti |
| 6,220,546 | B1 | 4/2001 | Klamka et al. |
| 6,247,666 | B1 | 6/2001 | Baker et al. |
| 6,354,540 | B1 | 3/2002 | Lewis |
| 6,357,699 | B1 | 3/2002 | Edberg |
| 6,364,252 | B1 | 4/2002 | Anderman |
| 6,454,216 | B1 | 9/2002 | Kiselev et al. |
| 6,457,306 | B1 | 10/2002 | Abel et al. |
| 6,666,402 | B2 | 12/2003 | Rupert et al. |
| 6,817,580 | B2 | 11/2004 | Smith |
| 6,926,576 | B1 | 8/2005 | Alway et al. |
| 7,543,779 | B1 | 6/2009 | Lewis |
| 8,393,582 | B1 | 3/2013 | Kutter |
| 8,695,473 | B2 | 4/2014 | Kametz |
| 8,727,654 | B2 | 5/2014 | Graham |
| 9,302,793 | B2 | 4/2016 | Ghofranian |
| 9,796,488 | B2 | 10/2017 | Cook |
| 9,963,250 | B2 | 5/2018 | Bultel |
| 10,189,556 | B2 | 1/2019 | Minchau et al. |
| 10,279,933 | B2 | 5/2019 | Lakshmanan |
| 10,351,268 | B2 | 7/2019 | Estevez |
| 10,407,965 | B2 | 9/2019 | Alford et al. |
| 10,689,133 | B2 | 6/2020 | Cheynet de Beaupre et al. |
| 11,565,628 | B2 * | 1/2023 | Johnson .................. B64G 1/64 |
| 2003/0150961 | A1 | 8/2003 | Boelitz et al. |
| 2003/0192984 | A1 | 10/2003 | Smith |
| 2005/0278120 | A1 | 12/2005 | Manfred et al. |
| 2006/0049316 | A1 | 3/2006 | Antonenko et al. |
| 2006/0113425 | A1 | 6/2006 | Rader |
| 2007/0012820 | A1 | 1/2007 | Buehler |
| 2008/0078884 | A1 | 4/2008 | Trabandt et al. |
| 2010/0213244 | A1 | 8/2010 | Miryekta et al. |
| 2013/0221162 | A1 | 8/2013 | Darooka |
| 2017/0225808 | A1 | 8/2017 | Echelman |
| 2017/0327252 | A1 | 11/2017 | Lim |
| 2018/0055227 | A1 | 3/2018 | Jones et al. |
| 2018/0186479 | A1 | 7/2018 | Johnson |
| 2020/0024011 | A1 | 1/2020 | Isayama |
| 2020/0102102 | A1 | 4/2020 | Liu |
| 2020/0270002 | A1 | 8/2020 | Johnson |
| 2020/0307461 | A1 * | 10/2020 | Johnson .................. B60R 5/041 |
| 2021/0031952 | A1 | 2/2021 | Moran |
| 2022/0388695 | A1 | 12/2022 | Patty |

OTHER PUBLICATIONS

Kelly et al., International Docketing Standard (IDSS) Interface Definition Document (IDD), No. HQ-E-DAA-TN39050, Oct. 2016, 142 pages.

* cited by examiner

FIG. 5

SPACECRAFT DEVICE WITH INCREASED CARGO CAPACITIES, AND ASSOCIATED SYSTEMS AND METHODS

TECHNICAL FIELD

The present technology is directed generally to spacecraft with increased cargo capacities, and associated systems and methods.

BACKGROUND

Rocket-propelled launch vehicles have long been used to carry spacecraft into earth orbit or beyond. The launch vehicle typically includes one or more booster stages that successively advance the spacecraft farther from the earth's surface, ultimately separating entirely from the spacecraft, which then carries out one or more space-based missions.

The spacecraft typically includes a cargo module (e.g., a satellite, space station supplies, crew, or the like) and a service module (e.g., a propulsion system and navigation, control, and guidance systems). The service module is responsible for delivering the cargo module to its destination. In many instances, the service module is specifically designed for a particular launch vehicle and/or cargo module. Accordingly, such service modules can become obsolete in light of changes made to the launch vehicle, for example, increased launch vehicle capacity. As a result, there exists a need for improving the versatility of service modules, and the overall cargo capacity of the associated spacecraft.

DETAILED DESCRIPTION

Several embodiments of the present technology are directed to spacecraft with increased cargo capacities, and associated systems and methods. In some embodiments, the systems can include annular support structures that carry cargo modules having an increased weight, with a load path that bypasses the service module connected to the cargo module. Accordingly, the service module need not be constructed so as to withstand the launch loads of the heavier cargo module to which it is attached. Instead, those increased launch loads can be passed around the service module via the annular support element. This arrangement can allow existing service modules to be used with much higher capacity cargo modules, including supplemental modules that are arranged radially around a central cargo module.

Several details describing structures and/or processes that are well-known and often associated with spacecraft systems, but that may unnecessarily obscure some significant aspects of the presently disclosed technology, are not set forth in the following description for purposes of clarity. Moreover, although the following disclosure sets forth several embodiments of the present technology, several other embodiments can have different configurations and/or different components than those described in this section. As such, the present technology may have other embodiments with additional elements, and/or without several of the elements described below with reference to FIGS. 1-5.

Several embodiments of the technology described below may take the form of computer- or controller-executable instructions, including routines executed by a programmable computer or controller. Those skilled in the relevant art will appreciate that the technology can be practiced on computer/controller systems other than those shown and described below. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a liquid crystal display (LCD).

Several of the features are described below with reference to particular corresponding Figures. Any of the features described herein may be combined in suitable manners with any of the other features described herein, without deviating from the scope of the present technology.

Figure 1:
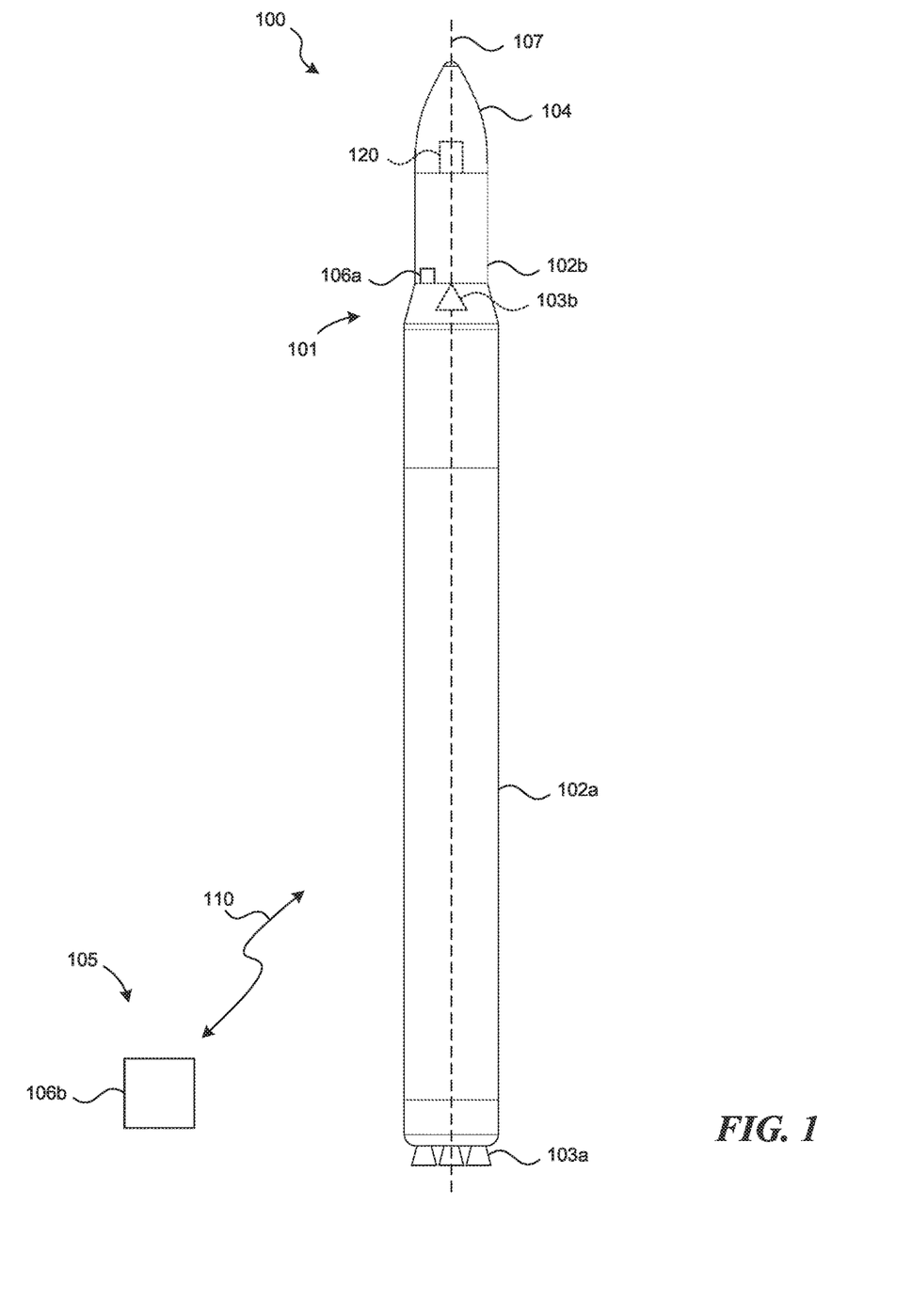
FIG. 1 is a partially schematic illustration of a launch vehicle carrying a cargo spacecraft in accordance with embodiments of the present technology.

FIG. 1 is a partially schematic, side view illustration of a representative spacecraft system 100 configured in accordance with some embodiments of the present technology. The spacecraft system 100 can include a launch vehicle 101 elongated along a launch vehicle axis 107. The launch vehicle 101 can include one or more stages, for example, a first booster stage 102a and a second booster stage 102b. Each booster stage includes a propulsion system, for example, one or more first stage engines 103a carried by the first booster stage 102a, and one or more second stage engines 103b carried by the second booster stage 102b. The one or more booster stages carry a cargo spacecraft 120 that is protected by a launch fairing 104 during launch. Once the booster stage or stages have carried the cargo spacecraft 120 beyond the earth's atmosphere, the fairing 104 is discarded to reduce the weight carried by the launch vehicle 101 as it continues to direct the cargo spacecraft 120 to its destination.

The spacecraft system 100 can further include a control system 105 that directs operations of the launch vehicle 101 and/or the cargo spacecraft 120. Accordingly, the control system 105 can include one or more controllers, illustrated in FIG. 1 as one or more onboard controllers 106a, and/or one or more offboard controllers 106b. The onboard and offboard controllers 106a, 106b can communicate with each other via a communication link 110 to control and/or monitor the operations of the overall system 100.

Figure 2A:
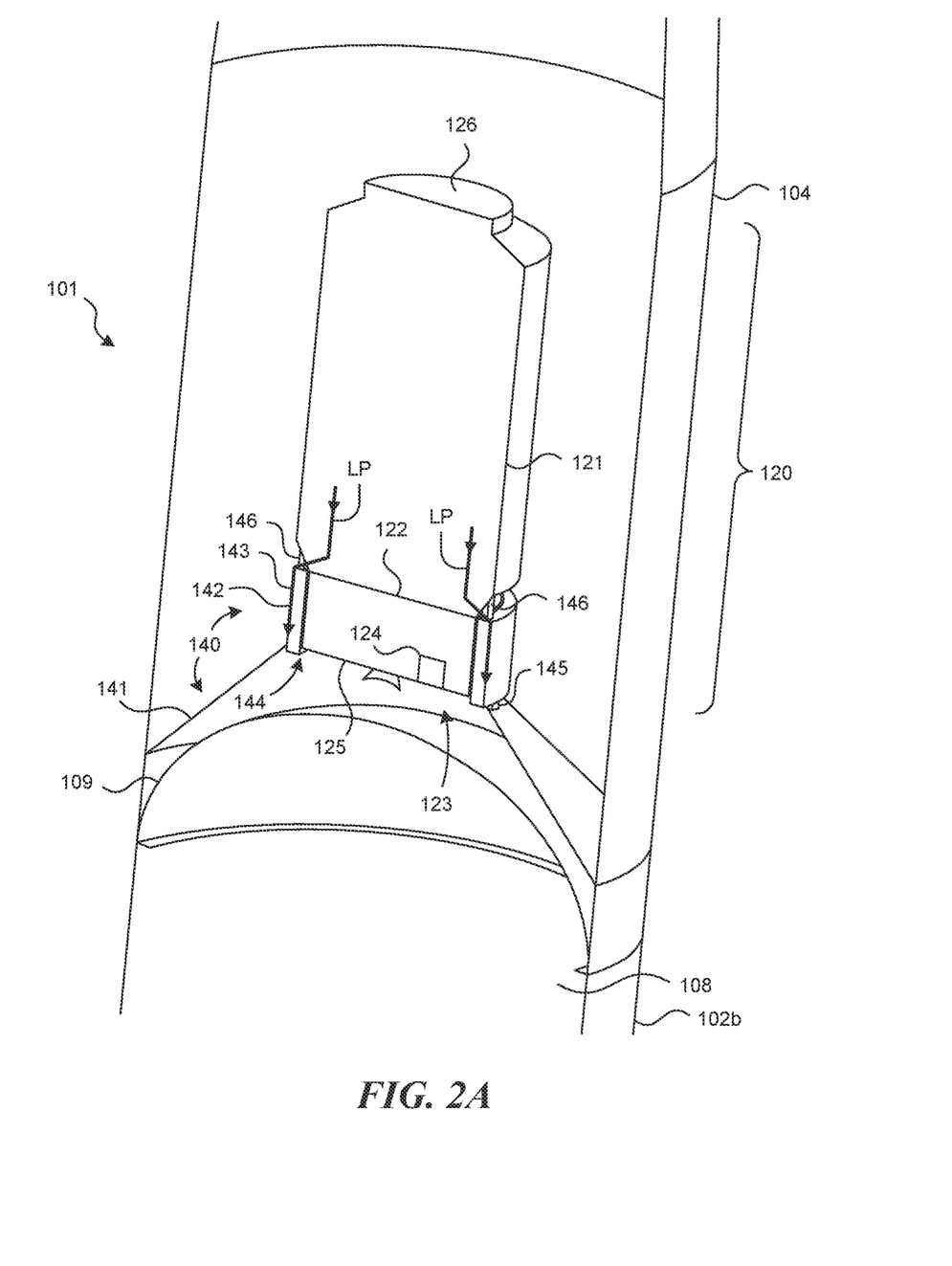
FIGS. 2A and 2B are partially schematic, cut-away, enlarged illustration of a portion of a representative launch vehicle and cargo module supported by the launch vehicle in accordance with embodiments of the present technology.
Figure 2B:
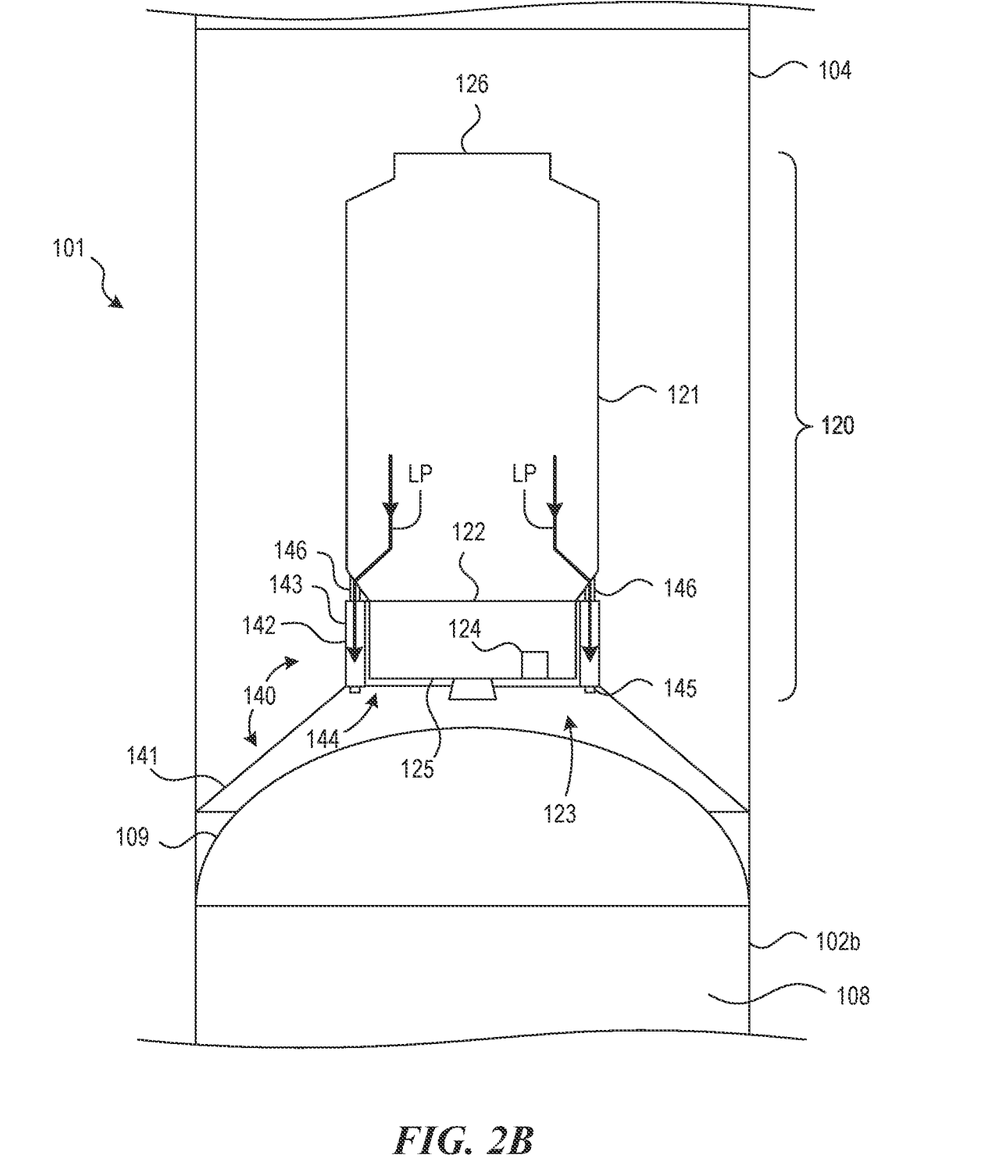

FIGS. 2A and 2B are enlarged, cut-away illustration of a portion of the launch vehicle 101 shown in FIG. 1, illustrating the upper end of the second stage booster 102b, and the cargo spacecraft 120 carried within the fairing 104. The second stage booster 102b can include a fuel tank 108 having an upper fuel tank end cap 109. The second stage booster 102b further includes a spacecraft support structure 140 that carries the cargo spacecraft during launch. The spacecraft support structure 140 can include a first portion 141, e.g., a conical structure that extends upwardly away from the fuel tank end cap 109, and a second portion 142 that engages the cargo spacecraft 120. The first portion 141 and the second portion 142 can be connected to each other via one or more suitable connection elements 145 (e.g., bolts and/or other suitable devices). In a particular embodiment, the second portion 142 includes an annular support structure 143 having an annulus 144 into which a portion of the cargo spacecraft 120 fits. Advantages of this arrangement are discussed further below.

The cargo spacecraft 120 can include a service module 122 attached to a cargo module 121. The cargo module 121 can carry human or nonhuman cargo to a space-based destination. For example, the cargo module 121 can carry crew and/or cargo to the International Space Station, and can access the International Space Station via an interface 126 (e.g., a port with docking features). In other embodiments, the cargo module 121 can carry a satellite or other suitable cargo. In any of these embodiments, the service module 122 provides control, guidance, and propulsion for the cargo module 121. Accordingly, the service module 122 can include service module systems 123, for example, a propulsion system 125 and one or more control systems 124. The systems 123 can include any one or more of a guidance system, a navigation system, a solar power system, a communications system, and/or any other suitable support system. Accordingly, at least some of the service module systems 123 can form part of the overall control system 105 described above with reference to FIG. 1.

The components carried by the service module 122 are typically relatively expensive. Accordingly, it is important to protect the service module 122, particularly during launch, when any structures positioned above the service module 122 place a significant downward load on the service module 122. Typically, the service module 122 is sized to withstand the launch loads presented by the cargo module 121. However, this approach may force the designer to make the service module 122 unnecessarily robust. For example, the service module 122 must provide the propulsion and guidance functions necessary to direct the cargo module 121 to its final destination. Any weight removed from the service module 122 can translate to more weight that can be carried by the cargo module 121, once the cargo spacecraft 120 has separated from the launch vehicle 101. Furthermore, a service module 122 that is sized for a particular cargo module 121 is typically unable to support loads any larger than the cargo module 121 for which it is designed. This in turn renders existing service modules 122 obsolete when the load capacity of the overall launch vehicle 101 increases, and/or when other, larger capacity launch vehicles, become available.

For at least the foregoing reasons, the annular support structure 143 can be configured to direct loads from the cargo module 121 directly to the first portion 141 of the spacecraft support structure 140, without the loads passing through the service module 122. More specifically, the annular support structure 143 can include separation elements 146 (e.g., interface adapter plates) that releasably attach to the cargo module 121, but not to the service module 122. Instead, the service module 122 can be located at least in part within the annulus 144 formed by the annular support structure 143. Accordingly, the service module 122 can hang from the cargo module 121. In at least some embodiments, the only loads carried by the service module 122 during launch are the loads created by the weight of the service module 122 itself. Loads created by the weight of the cargo module 121 pass outwardly around the service module 122 via load paths LP, as shown in FIGS. 2A and 2B.

In operation, when the ultimate booster stage (e.g., the second booster stage 102b shown in FIGS. 2A and 2B) has boosted the cargo spacecraft 120 to a target altitude, or has exhausted its propellant source, the separation elements 146 separate the cargo spacecraft 120 from the spacecraft support structure 140, using techniques similar or identical to those currently used to separate payloads from boosters. Accordingly, the spacecraft support structure 140, including the annular support structure 143, remains with the launch vehicle 101, while the cargo spacecraft 120 (e.g., the cargo module 121 with the service module 122 attached) continues on to its destination.

Figure 3A:
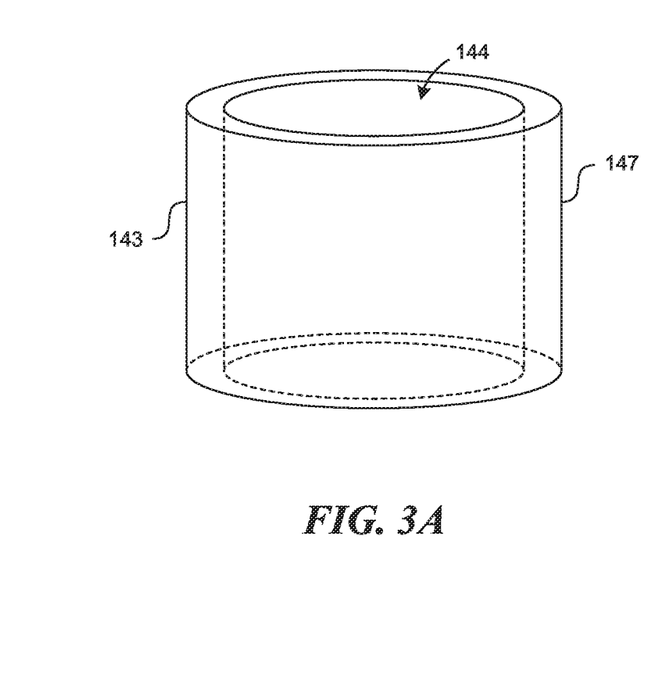
FIGS. 3A and 3B illustrate annular support structures for supporting cargo spacecraft in accordance with embodiments of the present technology.
Figure 3B:
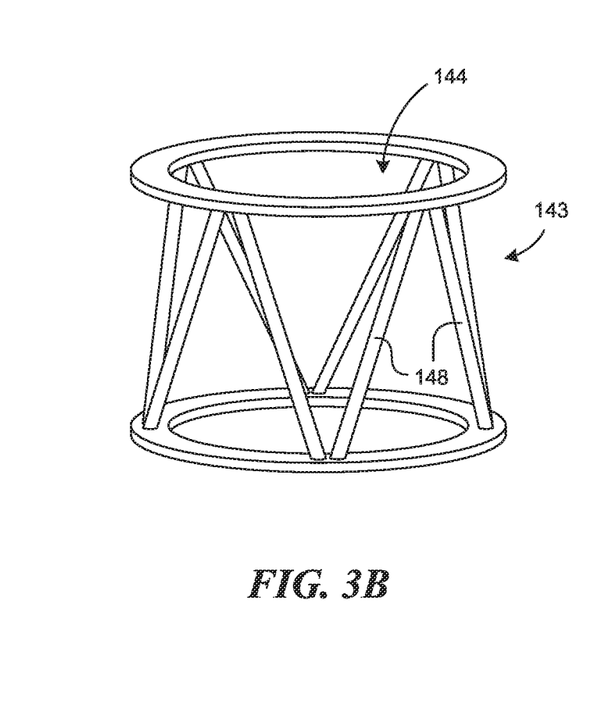

As shown in FIGS. 3A and 3B, the annular support structure 143 can have any of a variety of suitable arrangements. For example, as shown in FIG. 3A, the annular support structure 143 can include a cylinder 147 that at least partially encloses the annulus 144. The cylinder 147 can be made from strong, lightweight materials (e.g., titanium, aluminum, and/or suitable composites) sufficient to support the launch loads presented by the cargo module 121 (FIGS. 2A and 2B).

FIG. 3B illustrates a representative annular support structure 143 having one or more struts 148 that partially enclose the annulus 144. In some embodiments, the strut arrangement may have a lighter weight than the cylinder 147 shown in FIG. 3A. For example, the support structure can include multiple, individual struts 148, or a continuous (e.g., zig-zagging) struct 148, or a combination thereof. In any of these embodiments, the annulus 144 is sized to accommodate the service module 122, and the annular support structure 143 is sized to mate with, and carry the weight of, the cargo module 121.

Figure 4A:
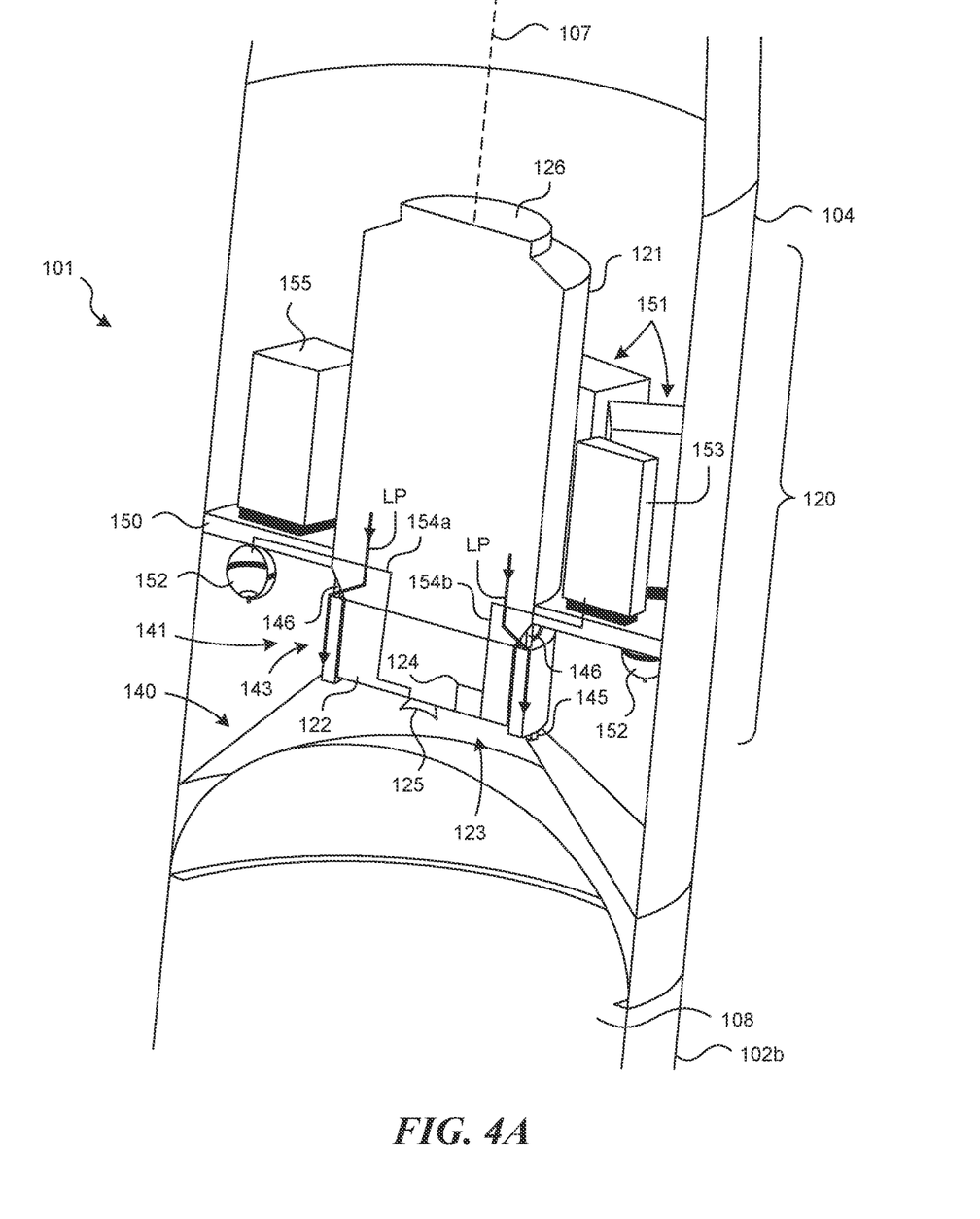
FIGS. 4A and 4B are partially schematic, cut-away illustration of a portion of a launch vehicle supporting a cargo spacecraft and supplemental supply elements in accordance with embodiments of the present technology.
Figure 4B:
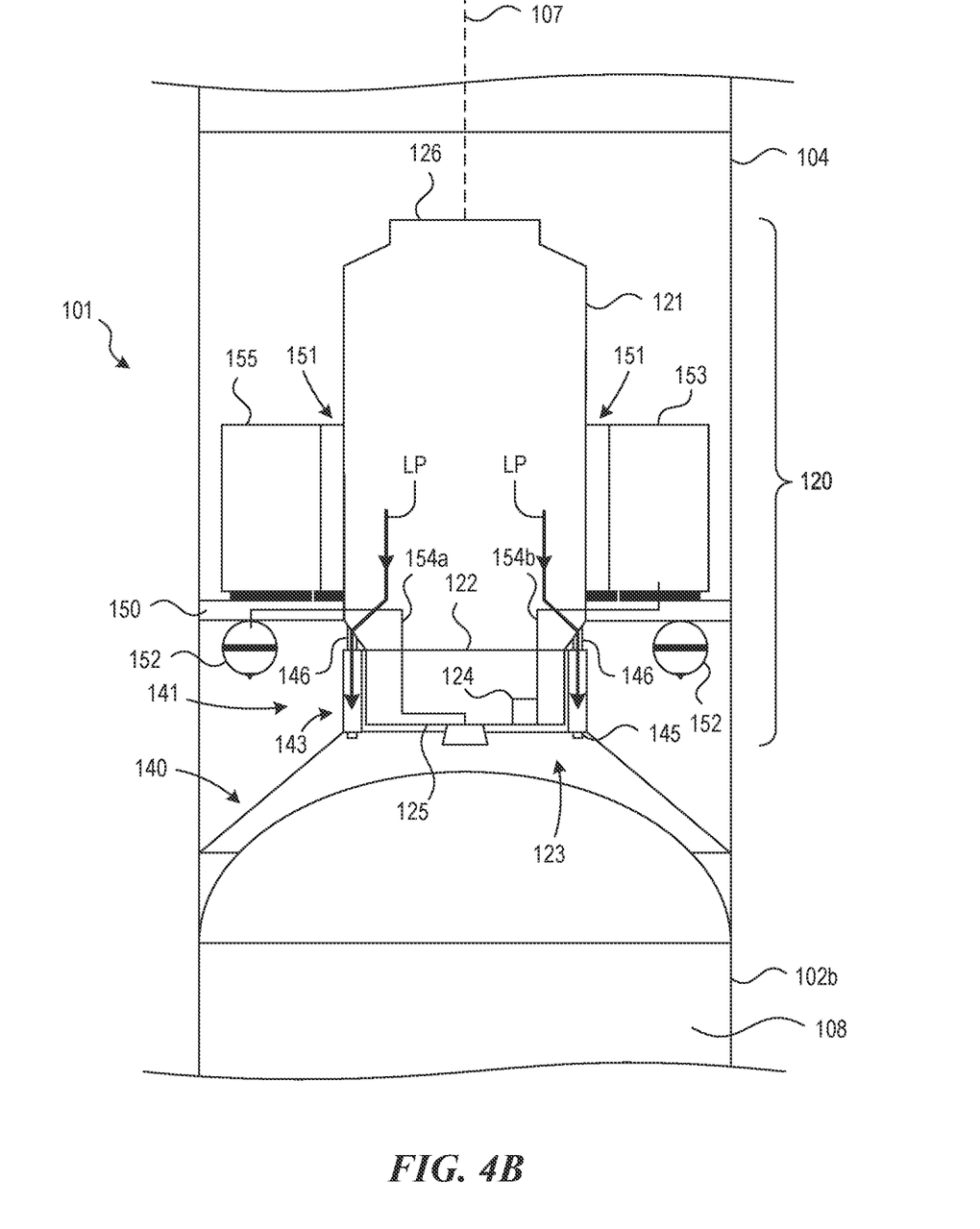

In addition to carrying a cargo module for which the service module may have been originally designed, the arrangements disclosed herein can be used to carry additional cargo. For example, FIGS. 4A and 4B illustrates the launch vehicle 101 with a cargo spacecraft 120 that includes a supplemental supply support 150 extending radially outwardly from the cargo module 121, the service module 122, and the annular support structure 143. In a particular aspect of this embodiment, the supplemental supply support 150 is carried by the cargo module 121. Accordingly, any loads presented by the supplemental supply support 150, and the cargo that it carries, are, like the loads of the cargo module 121, passed around the service module 122 into the first portion 141 of the spacecraft support structure 140 via the annular support structure 143.

The cargo that may be supported by the supplemental supply support 150 can include one or more supplemental supply elements 151. The supplemental supply elements 151 can carry supplies that are used by the service module 122, and/or supplies that, like the cargo in the cargo module 121, are delivered to an end destination. For example, the supplemental supply elements 151 can include supplemental propellant tanks 152 coupled via a propellant link 154a to the propulsion system 125 of the service module 122. As another example, the supplemental supply elements 151 can include solar cells and/or batteries 153 coupled to other service module systems 123, for example, the control system 124, via a power link 154b. Once the cargo spacecraft 120 has been separated from the launch vehicle 101, the solar cells 153 can provide additional power (that would not have been otherwise available) to the control systems 124.

Supplemental supply elements 151 that are not operatively connected to the service module can include cargo containers 155, for example, standardized cargo containers. The cargo containers 155 can supplement the cargo capacity of the centrally positioned cargo module 121. The cargo containers 155 can be standardized, so that multiple cargo containers can easily be interchanged between different launch vehicles, and/or different types of launch vehicles. This approach can be applied to any/all of the supplemental supply elements 151, e.g., supplemental supply elements 151 that are operatively coupled to the service module 122, and/or supplemental supply elements 151 that are not.

As shown in FIGS. 4A and 4B, the supplemental supply elements 151 can be positioned on the upper or forward portion of the supplemental supply support 150, or can be positioned on the lower surface of the supplemental supply support 150. For example, the propellant tanks 152 are shown as being carried via the lower surface of the supplemental supply support 150. In further embodiments, other elements may also be carried by and/or positioned at this surface. For example, the supplemental supply support 150 can carry solar panels at the rearward or downward facing surface, to provide electrical energy to the service module 122 and/or other elements of the cargo spacecraft 120, after the cargo spacecraft has separated from the launch vehicle 101.

As shown in FIGS. 4A and 4B, the annular support structure 143 can be configured to carry supplemental cargo arranged concentrically around the main cargo module 121. In other embodiments, the annular support structure 143 can carry additional cargo positioned axially along the launch vehicle axis 107, in addition to, or in lieu of, additional cargo arranged concentrically around the cargo module 121.

Figure 5:
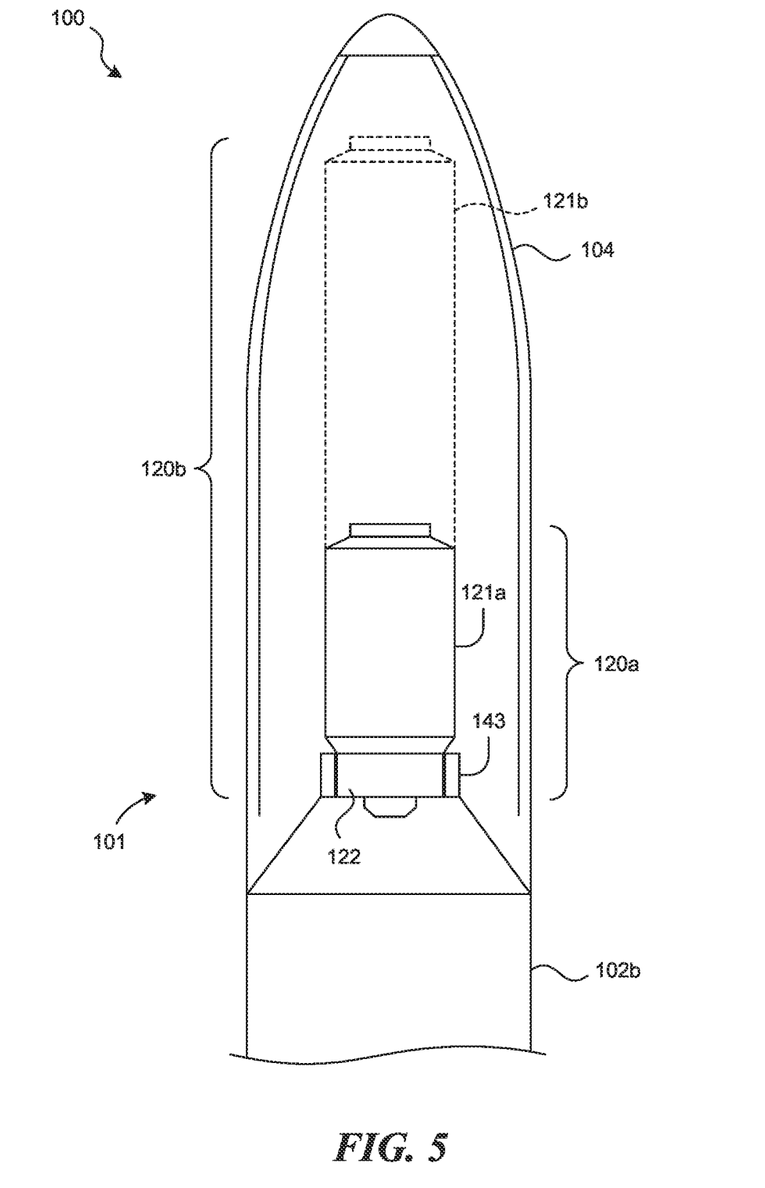
FIG. 5 is a partially schematic, cut-away illustration of a representative launch vehicle configured to carry an enlarged cargo module in accordance with embodiments of the present technology.

For example, FIG. 5 illustrates a first cargo spacecraft 120a having a first cargo module 121a and sized generally similarly to the cargo vehicle 120 shown in FIGS. 2A-2B and 4A-4B. As a result of the extra volume available within the fairing 104 above the service module 122, the first cargo spacecraft 120a can be replaced by a second cargo spacecraft 120b having a significantly larger cargo module 121b attached to the same size service module 122. Accordingly, the annular support structure 143 can support the additional launch loads presented by the significantly larger second cargo module 121b by directing the loads around the service module 122, generally as described above. As stated above, this arrangement can be used in addition to, or in lieu of, the supplemental supply support 150 described above with reference to FIG. 4. Providing both may produce synergistic results. For example, the additional capacity of the second cargo module 121b may require that additional power and/or other functions be provided by the service module 122. Adding the supplemental supply support 150 and associated propellant tanks, solar cells, and/or other additional equipment can meet this additional requirement placed on the service module 122.

One feature of representative embodiments described above is that the annular support structure can provide support for cargo modules (e.g., particularly during launch), via a load path that bypasses the associated service module. As a result, existing service modules, built for smaller cargo modules, can still be used to handle larger cargo modules. In addition to, or in lieu of, this advantage, new service modules can be sized to have a reduced load carrying capacity. In particular, such service modules need only be sized to withstand the launch loads associated with hanging the service module from the annular support structure, and need not carry loads associated with the cargo module above, and/or cargo carried radially outwardly from the service module.

From the foregoing, it will be appreciated that specific embodiments of the present technology have been described herein for purposes of illustration, but that various modifications may be made without deviating from the technology. For example, the annular support structure can have configurations different than those specifically disclosed in the Figures. The service modules and/or cargo modules can also have different configurations than those specifically shown in the Figures. The cargo module 120 can be pressurized and/or can include pressurized compartments, or the cargo module 120 can be unpressurized, depending upon the cargo carried by the cargo module and/or the mission carried out by the cargo module. The supplemental supply elements 151 can also be pressurized or unpressurized, depending upon the contents of the particular supplemental supply elements and/or the mission of the cargo spacecraft 120.

Certain aspects of the technology described in the context of particular embodiments may be combined or eliminated in other embodiments. For example, the enlarged cargo module 121b shown in FIG. 5 may be combined with the supplemental supply support 150 shown in FIGS. 4A and 4B. As another example, the launch vehicle can include only a single booster stage, or can include more than two booster stages. Further, while advantages associated with some embodiments of the present technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

As used herein, the term "and/or" as in "A and/or B" refers to A alone, B alone, and both A and B.

I claim:

1. A spacecraft device, comprising:
   an annular support structure fixedly coupleable to at least one stage of a launch vehicle that is elongated along a launch vehicle axis, the annular support structure being positionable to releasably support a cargo spacecraft, the cargo spacecraft having:
   a propulsion section, and
   a cargo section consisting of cargo or configured to carry cargo, with the cargo section of the cargo spacecraft positionable along the launch vehicle axis in a direction distal from the annular support structure, and with at least a portion of the cargo spacecraft positionable within an annulus of the annular support structure; and
   wherein the annular support structure is configured to remain carried by the at least one stage when the cargo spacecraft separates from the launch vehicle.

2. The device of claim 1 wherein the at least a portion of the cargo spacecraft positionable within the annulus includes the propulsion section.

3. The device of claim 1 wherein the annular support structure includes a cylinder.

4. The device of claim 1 wherein the annular support structure includes at least one strut positioned around the annulus.

5. The device of claim 1 wherein the annular support structure includes a plurality of struts positioned around the annulus.

6. The device of claim 1 wherein the annular support structure includes separation structures positioned to releasably engage the cargo section of the cargo spacecraft.

7. A spacecraft system, comprising:
an annular support structure according to claim 1; and
a cargo spacecraft.

8. The device of claim 7 wherein the propulsion section of the cargo spacecraft is at least partially suspended from at least one of the cargo section or the annular support structure.

9. The device of claim 7 wherein the propulsion section of the cargo spacecraft carries at least one of: a guidance system, a navigation system, a control system, a solar power system, and/or a communications system.

10. The device of claim 7 wherein the cargo section of the cargo spacecraft is configured to carry human cargo.

11. The device of claim 7 wherein the cargo section of the cargo spacecraft is configured to carry non-human cargo.

12. The device of claim 7, further comprising a supplemental supply support carried by, and extending radially outwardly from, the cargo section, the supplemental supply support being positioned along the launch vehicle axis in a direction distal from the annular support structure to transmit loads along the load path from the cargo section to the at least one stage and around the propulsion section.

13. The device of claim 12, further comprising a supplemental cargo section carried by the supplemental supply support.

14. The device of claim 13 wherein the supplemental cargo section is operatively coupled to the propulsion section.

15. The device of claim 14 wherein the supplemental cargo section includes a power supply for the propulsion section.

16. The device of claim 13 wherein the supplemental cargo section is operatively independent of the propulsion section.

17. A method for making a spacecraft device, comprising:
forming an annular support structure having an annular opening positioned to receive at least a portion of a cargo spacecraft; and
attaching to the annular support structure a separation element configured to releasably attach to the cargo spacecraft at a position on the cargo spacecraft that suspends the at least a portion of the cargo spacecraft in the annular opening,
wherein the annular support structure is configured to remain attached to a launch vehicle when the cargo spacecraft separates from the launch vehicle.

18. The method of claim 17 wherein the support structure includes a first portion connectable to the launch vehicle, and a second portion connected to the first portion, wherein the second portion carries the separation element.

19. The method of claim 18 wherein the first portion has a truncated cone shape and the second portion is cylindrical.

20. The method of claim 17 wherein the annular support structure includes a plurality of struts.

21. The method of claim 17, further comprising attaching the annular support structure to the cargo spacecraft.

* * * * *